Sept. 17, 1946.  W. R. MacCLUNEY  2,407,758
FASTENING DEVICE
Filed July 19, 1945
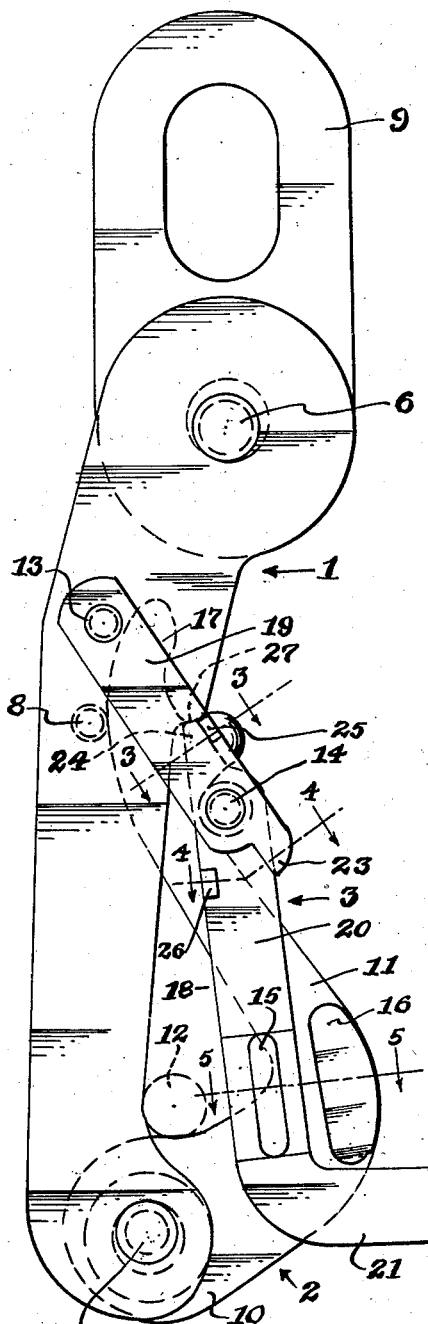
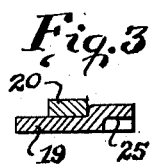
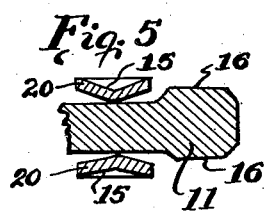
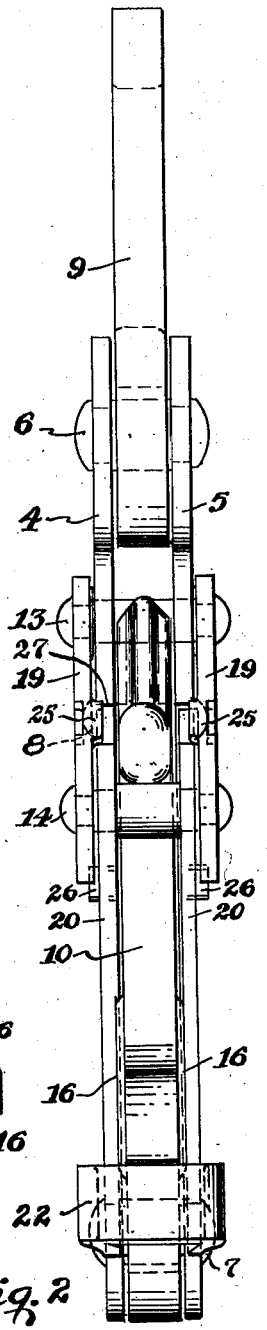
INVENTOR.
WILLIAM ROBERT MacCLUNEY
BY *Whittemore Hulbert & Belknap*
Attorneys Patented Sept. 17, 1946

2,407,758

UNITED STATES PATENT OFFICE 2,407,758

FASTENING DEVICE

William Robert MacCluney, Dearborn, Mich.

Application July 19, 1945, Serial No. 605,871

5 Claims. (Cl. 294—83)

The invention relates to fastening devices and refers more particularly to pelican hooks.

The invention has for one of its objects to provide an improved fastening device in which the retaining means for holding the parts of the fastening device in closed position is constructed to facilitate release of the retaining means.

The invention has for another object to construct the retaining means of pivotally connected lever members, one of which is pivotally connected to the frame of the fastening device and the other of which has a part for fulcruming on the frame intermediate the pivot between the lever members and the pivot between the frame and the lever member pivoted thereto.

The invention has for a further object to construct the retaining means of lever members which are pivotally connected to each other and have a limited angular movement relative to each other.

With these as well as other objects in view, the invention resides in the novel features of construction and combinations and arrangements of parts as more fully hereinafter set forth.

In the drawing:

Figure 1 is a side elevation of a fastening device embodying the invention;

Figure 2 is an edge elevation thereof;

Figures 3, 4 and 5 are cross sections on the lines 3—3, 4—4 and 5—5, respectively, of Figure 1.

The fastening device is a pelican hook particularly adapted for use in life saving equipment, although it is apparent that it may be used in other lines of work. The fastening device comprises the frame 1, the curved member 2 and the retaining means 3.

The frame 1 is formed of the spaced substantially parallel frame members 4 and 5 which are fixedly secured together, both at and intermediate their ends, by means of the shoulder pins 6 and 7 and 8 which are riveted over at their ends and have shoulders abutting the frame member to space them a predetermined distance apart. The pin 6 forms an attaching means and, as illustrated in the present instance, the pin forms a pivot loosely engaged by the link 9. The curved member 2 is an L-shaped member having the arm 10 extending between the frame members 4 and 5 and loosely engaging the pin 7 which forms a pivot for the curved member. The curved member also has the arm 11 extending transversely of the arm 10 and adapted in the closed position of the curved member to extend between the frame members 4 and 5. The curved member 2 cooperates with the frame 1 in the closed position of the curved member to form an eye for receiving an attachment member 12, such as a sling link, which is located between the pins 6 and 7 and is positioned so that the tension line caused by the load passes through the pins. The retaining means 3 is pivotally connected to the frame members 4 and 5 by the shoulder pivot pin 13 located near the ends of the frame members having the pivot pin 6. The retaining means has the shoulder pin 14 which is engageable with the arm 11 of the curved member 2 to hold the latter in closed position and the retaining means is held in place to hold the curved member in closed position by means of the projections 15 on the retaining means which have been passed over the projections 16 on the curved member and are located between the frame members 4 and 5 and the projections 16 when the parts are in operative position with the curved member 2 in closed position.

For the purpose of facilitating release of the retaining means, the retaining means is formed of the levers 17 and 18 which are pivotally connected together by the shoulder pin 14. The lever 17 is formed of the spaced substantially parallel lever members 19 which embrace the frame members 4 and 5 and are pivotally connected to these frame members by the pivot pin 13 which has shoulders abutting the lever members to space the same apart and is riveted over at its end. The lever 18 is one piece and has the spaced substantially parallel lever members 20 which are in the planes of the frame members 4 and 5 and which are provided at their free ends with the lateral parts 21 connected by the transverse part 22. The parts 21 and 22 form an actuating part engageable by hand or a lanyard or rope to move the retaining means to released position. The lever members 20 are resilient and have the projections 15 extending toward each other and engageable with the projections 16 to flex the lever members. The pivot pin 14 is also riveted over at its ends and has different shoulders abutting the lever members 20 and also the lever members 19 to space them apart.

To limit swinging movement of the curved member 2 to closed position the shoulder pin 8 is positioned to engage the arm 11 of the curved member near its free end.

The levers 17 and 18 have limited angular movement relative to each other which is secured by forming the lever members 19 and 20 at their ends adjacent the pivot pin 14 with the extensions 23 and 24, respectively, of less width than the lever members and with the inwardly and outwardly depressed projections 25 and 26, respectively. The extensions 23 are engageable with the projections 26 when the retaining means is being moved to releasing position by means of the lever 18, at which time the lever 18 when being swung upwardly will swing the lever 17 upwardly. The extensions 24 are engageable with the projections 25 in the operative position of the parts with the curved member 2 in closed position.

The frame members 4 and 5 are formed with the shoulders 27 in their edges for engagement by the ends of the extensions 24 of the lever 18 when the retaining means 3 is subjected to force by the curved member 2 as the result of a load tending to move the curved member to open position. As a consequence, upward swinging of the lever 17 when the parts are in operative position is limited. The portions of the edges of the frame members immediately adjacent and below the shoulders, as in Figure 1, are engageable by the extensions 24 and serve as fulcrums for the lever members 20 when force is exerted either by hand upon the transverse part 22 or by a lanyard or rope connected to the transverse part to move the retaining means to a position to release the curved member and allow it to open. In the operative position of the parts, the ends of the extensions 24 of the lever members 20 and also the shoulders 27 are above the line connecting the axes of the pivot pins 13 and 14 and are, therefore, past dead center to thereby serve in more effectively locking the parts in closed position.

It will thus be seen that by forming the retaining means of levers pivotally connected together with one pivotally connected to the frame and the other adapted to fulcrum on the frame intermediate the pivot connecting the levers together and the pivot connecting one lever to the frame increased leverage is provided for releasing the pelican hook. It will also be seen that a strong substantial construction of pelican hook is provided.

What I claim as my invention is:

1. A fastening device comprising a frame having attaching means at one end, a member cooperating with said frame in the closed position of said member to form an eye for receiving an attachment member and retaining means for holding said first mentioned member in closed position, said retaining means comprising a lever pivoted to said frame and a second lever pivoted to said first mentioned lever and having an actuating part and a second part for fulcruming on said frame intermediate the pivot between said frame and first mentioned lever and the pivot between said levers.

2. A fastening device comprising a frame having attaching means at one end, a member cooperating with said frame in the closed position of said member to form an eye for receiving an attaching member and retaining means for holding said first mentioned member in closed position, said retaining means comprising pivotally connected levers having limited angular movement relative to each other and a pin extending between and forming a pivot for said levers and a retaining member for said first mentioned member, one of said levers being pivoted to said frame and the other of said levers having a part for fulcruming on said frame intermediate said pin and the pivot between said frame and said first mentioned lever.

3. A fastening device comprising spaced substantially parallel frame members, a curved member extending between and pivotally connected to said frame members and cooperating therewith in the closed position of said curved member to form an eye for receiving an attachment member and retaining means for holding said curved member in closed position, said retaining means comprising spaced substantially parallel lever members embracing said frame members and pivoted thereto, and other spaced substantially parallel lever members in the planes of said frame members and pivoted to said first mentioned lever members and having parts for fulcruming on said frame members intermediate the pivot between said frame members and first mentioned lever members and the pivot between said first and second mentioned lever members.

4. A fastening device comprising a frame having an attaching means at one end, a curved member cooperating with said frame in the closed position of said curved member to form an eye for receiving an attachment member and retaining means for holding said curved member in closed position, said retaining means comprising pivotally connected levers and a pin extending between and forming a pivot for said levers and a retaining member for said curved member, one of said levers being pivoted to said frame and the other of said levers having an actuating part at its free end and a part for fulcruming on said frame intermediate said pin and the pivot for said first mentioned lever, and cooperating means on said curved member and second lever for yieldably securing said second lever in place to hold said curved member in closed position.

5. A fastening device comprising spaced substantially parallel frame members having corresponding edges formed with shoulders, a curved member extending between and pivoted to said frame members and cooperating therewith in the closed position of said curved member to form an eye for receiving an attachment member and retaining means for holding said curved member in closed position, said retaining means comprising lever members embracing and pivotally connected to said frame members, and other lever members in the planes of said frame members and pivotally connected to and having limited angular movement with respect to said first mentioned lever members, and cooperating means on said curved member and other lever members for yieldably holding said other lever members in position to hold said curved member in closed position, said other lever members having parts for fulcruming on said frame members during the opening movement of said other lever members and said other lever members also being engageable with said shoulders to limit opening movement of said first mentioned lever members under force exerted by said curved member.

WILLIAM ROBERT MacCLUNEY.